(12) United States Patent
Schultz

(10) Patent No.: US 11,704,836 B2
(45) Date of Patent: *Jul. 18, 2023

(54) ENCODING AND DECODING VISUAL INFORMATION

(71) Applicant: More Than Halfway, L.L.C., Phoenix, AZ (US)

(72) Inventor: Brent Schultz, Phoenix, AZ (US)

(73) Assignee: More Than Halfway, L.L.C., Phoenix, AZ (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/149,412

(22) Filed: Jan. 14, 2021

(65) Prior Publication Data
US 2021/0166431 A1 Jun. 3, 2021

Related U.S. Application Data

(63) Continuation of application No. 16/743,817, filed on Jan. 15, 2020, now Pat. No. 10,930,019.

(60) Provisional application No. 62/864,951, filed on Jun. 21, 2019, provisional application No. 62/792,879, filed on Jan. 15, 2019.

(51) Int. Cl.
*G06T 9/00* (2006.01)
*G06F 21/30* (2013.01)
*G06T 3/40* (2006.01)

(52) U.S. Cl.
CPC ............. *G06T 9/00* (2013.01); *G06F 21/30* (2013.01); *G06T 3/40* (2013.01); *G06T 2201/00* (2013.01)

(58) Field of Classification Search
CPC .......... G06T 9/00; G06T 2201/00; G06T 3/40
See application file for complete search history.

(56) References Cited

U.S. PATENT DOCUMENTS

| | | | |
|---|---|---|---|
| 3,785,819 A * | 1/1974 | Barnes, Jr. | G02B 13/08 430/494 |
| 5,799,939 A * | 9/1998 | Schneider | A63F 9/0613 472/63 |
| 6,120,295 A * | 9/2000 | Pracas | G09B 11/04 434/81 |
| 6,243,416 B1 | 6/2001 | Matsushiro et al. | |
| RE37,668 E | 4/2002 | Etoh | |

(Continued)

FOREIGN PATENT DOCUMENTS

| | | |
|---|---|---|
| CN | 108476319 A | 8/2018 |
| WO | 2018165729 A1 | 9/2018 |

*Primary Examiner* — Ian L Lemieux
(74) *Attorney, Agent, or Firm* — Peacock Law P.C.; Deborah A. Peacock; Justin R. Jackson

(57) ABSTRACT

A method and computer software for creating an encoded image and which can optionally include a method for decoding the encoded image. The encoded image is preferably formed from at least one symmetric image but can be formed from a plurality of symmetric images. Embodiments of the present invention can be performed with physical paper and writing utensils or can be performed via computer software. Embodiments of the present invention can be used for art authentication based on results obtained by decoding an image. In one embodiment, one or more encoded image elements can be revealed simultaneously. Optionally, however, encoded image elements can be caused to be revealed in a series that gives a sense of motion in a manner similar to that of motion picture animation.

16 Claims, 19 Drawing Sheets

(56) References Cited

U.S. PATENT DOCUMENTS

| | | |
|---|---|---|
| 6,865,001 B2 | 3/2005 | Long et al. |
| 8,194,914 B1 | 6/2012 | Skogg et al. |
| 8,462,986 B2 | 6/2013 | Crookham et al. |
| 9,271,006 B2 | 2/2016 | Huang et al. |
| 10,146,971 B1 | 12/2018 | Cansizoglu et al. |
| 10,652,251 B2 | 5/2020 | Leach et al. |
| 2003/0190056 A1 | 10/2003 | Metois |
| 2004/0076310 A1* | 4/2004 | Hersch ................. G07D 7/0032 382/100 |
| 2004/0151394 A1 | 8/2004 | Soderberg et al. |
| 2005/0053236 A1 | 3/2005 | Samii et al. |
| 2005/0237577 A1 | 10/2005 | Alasia et al. |
| 2005/0243305 A1 | 11/2005 | Vig et al. |
| 2006/0029278 A1 | 2/2006 | Alasia et al. |
| 2006/0097062 A1 | 5/2006 | Cheong et al. |
| 2006/0177057 A1 | 8/2006 | Alasia |
| 2008/0002853 A1 | 1/2008 | Kawabe et al. |
| 2008/0044015 A1 | 2/2008 | Alasia |
| 2009/0255992 A1 | 10/2009 | Shen |
| 2011/0123125 A1 | 5/2011 | Alasia et al. |
| 2011/0150361 A1 | 6/2011 | Mccarthy et al. |
| 2012/0087538 A1 | 4/2012 | Cvetkovic et al. |
| 2013/0114876 A1 | 5/2013 | Rudaz et al. |
| 2013/0236113 A1 | 9/2013 | Tahara et al. |
| 2014/0334665 A1 | 11/2014 | Quinn et al. |
| 2015/0098508 A1 | 4/2015 | Yie et al. |
| 2015/0334339 A1 | 11/2015 | Dejene |
| 2016/0021372 A1 | 1/2016 | Kim et al. |
| 2016/0205406 A1 | 7/2016 | Cao |
| 2018/0184100 A1 | 6/2018 | Chesnokov |
| 2020/0311505 A1 | 10/2020 | Kamath |

\* cited by examiner

ENCODING AND DECODING VISUAL INFORMATION

CROSS-REFERENCE TO RELATED APPLICATIONS

This application is a continuation application of U.S. patent application Ser. No. 16/743,817, filed on Jan. 15, 2020, entitled "Encoding and Decoding Visual Information", which itself claims priority to and the benefit of the filing of U.S. Provisional Patent Application No. 62/792,879, entitled "Decoding and Encoding Visual Information Method", filed on Jan. 15, 2019, and U.S. Provisional Patent Application No. 62/864,951, entitled "Encoding and Decoding Visual Information", filed on Jun. 21, 2019, and the specifications and claims thereof are incorporated herein by reference.

BACKGROUND OF THE INVENTION

Embodiments of the present invention relate to a method and computer software for producing an encoded image and a method and computer software for decoding an encoded image.

Although encoding techniques have been known for some time, such techniques often require sophisticated equipment and/or sophisticated algorithms to decode the encoded information. Other known systems require a significant amount of time and thinking to slowly decode encoded information. Most of the known systems are directed to encoding text. Known systems that encode images typically require the image to be digitally deconstructed and then mathematical algorithms performed on the digital data of the image, There is thus a present need for a system, method, and computer software which can simply and quickly decode images.

BRIEF SUMMARY OF EMBODIMENTS OF THE PRESENT INVENTION

Embodiments of the present invention relate to a method that includes obtaining a plurality of image elements that are at least substantially symmetric, creating a plurality of bisected image elements by bisecting the plurality of image elements along a plane of symmetry of each respective image element, removing one half of each of the plurality of bisected image elements, creating a plurality of reflected bisected image elements by reflecting one or more portions of the plurality of bisected image elements across the respective plane of symmetry of each of the plurality of bisected image elements, and creating a composite image by at least partially overlapping at least some of the reflected bisected image elements. The method can include embellishments, which can optionally be added to at least one of the reflected bisected image elements, at least one of the bisected image elements, and/or to the composite image.

Obtaining a plurality of image elements can include obtaining two image elements, creating a plurality of reflected bisected image elements, and creating a composite image can include reflecting portions of two bisected image elements and overlapping portions of two reflected bisected image elements such that the composite image includes an at least substantially interdigitated image.

The method can also include creating a decoding image by obtaining a mirror image of the composite image. The method can also include decoding at least a portion of the composite image by aligning a plane of symmetry of at least one of the reflected bisected image elements of the composite image with a respective plane of symmetry in the mirror image of the composite image such that the plane of symmetry in the composite image and the plane of symmetry in the mirror image of the composite image are atop one another. The method can also include gradually moving the mirror image of the composite image with respect to the composite image such that a plurality of decoded images are sequentially revealed. Optionally, creating a composite image can include at least partially overlapping at least some of the reflected bisected image elements such that as the composite image is gradually decoded by moving the mirror image of the composite image with respect to the composite image, a story is revealed in the form of sequentially decoded image elements.

In one embodiment, creating a composite image can include at least partially overlapping at least some of the reflected bisected image elements such that as the composite image is gradually decoded by moving the mirror image of the composite image with respect to the composite image an animated motion picture is revealed in the form of sequentially decoded image elements. In one embodiment, at least a portion of the composite image and/or at least a portion of the mirror image of the composite image can be at least partially transparent.

Embodiments of the present invention also relate to computer software stored on non-transitory computer readable medium, the software including code obtaining a plurality of image elements that are at least substantially symmetric, code creating a plurality of bisected image elements by bisecting the plurality of image elements along a plane of symmetry of each respective image element, code removing one half of each of the plurality of bisected image elements, code creating a plurality of reflected bisected image elements by reflecting one or more portions of the plurality of bisected image elements across the respective plane of symmetry of each of the plurality of bisected image elements, and code creating a composite image by at least partially overlapping at least some of the reflected bisected image elements. The computer software can also include code adding embellishments, which can include code adding embellishments to at least one of the reflected bisected image elements, at least one of the bisected image elements and/or the composite image.

In one embodiment, code obtaining a plurality of image elements can include code obtaining two image elements and the code creating a plurality of reflected bisected image elements and the code creating a composite image can include code reflecting portions of two bisected image elements and code overlapping portions of two reflected bisected image elements such that the composite image comprises an at least substantially interdigitated image. The computer software can also include code creating a decoding image by obtaining a mirror image of the composite image, and can include code decoding at least a portion of the composite image by aligning a plane of symmetry of at least one of the reflected bisected image elements of the composite image with a respective plane of symmetry in the mirror image of the composite image such that the plane of symmetry in the composite image and the plane of symmetry in the mirror image of the composite image are atop one another. The computer software can also include code gradually moving the mirror image of the composite image with respect to the composite image such that a plurality of decoded images are sequentially revealed. Optionally, creating a composite image can include code at least partially overlapping at least some of the reflected bisected image elements such that as the composite image is gradually decoded by moving the mirror image of the composite image with respect to the composite image a story is revealed in the form of sequentially decoded image elements. Code creating a composite image can include code at least partially overlapping at least some of the reflected bisected image elements such that as the composite image is gradually decoded by moving the mirror image of the composite image with respect to the composite image an animated motion picture is revealed in the form of sequentially decoded image elements. Code obtaining a plurality of image elements that are at least substantially symmetric can include code obtaining at least one image element stored in memory. Optionally, code obtaining a plurality of image elements that are at least substantially symmetric can include code activating a camera to obtain at least one image element.

Embodiments of the present invention also relate to an art authentication method that includes obtaining an image of artwork, forming a mirror image of the artwork, wherein the image of the artwork, the mirror image of the artwork or a combination thereof is at least partially transparent, positioning the mirror image of the artwork atop the image of the artwork or positioning the image of the artwork atop the mirror image of the artwork, moving the mirror image of the artwork with respect to the image of the artwork and/or moving the image of the artwork with respect to the mirror image of the artwork in an attempt to reveal hidden encoded images, attributing the artwork to an artist or discrediting the attribution of the artwork to an artist based at least in part on revealed hidden encoded images or lack of hidden encoded images. The art authentication method can include using the method to further support attribution of an artwork to a known artist, and/or to discredit the attribution of an artwork to an alleged artist. The image of the artwork and/or the mirror image of the artwork can be at least partially transparent. Moving the mirror image of the artwork with respect to the image of the artwork and/or moving the image of the artwork with respect to the mirror image of the artwork can include sliding the image of the artwork and/or the mirror image of the artwork in a straight line and/or rotating the image of the artwork and/or the mirror image of the artwork.

Attributing the artwork to an artist or discrediting the attribution of the artwork to an artist can be based on at least a quality or lack of quality of a hidden encoded image and/or can be based on based on at least a quantity or lack of quantity of hidden encoded images, which quantity can optionally be predetermined. Forming a mirror image of the artwork, positioning the mirror image, and moving the mirror image and/or the artwork can be performed via a computer operating on software stored in a tangible medium.

Embodiments of the present invention relate to a method for encoding and decoding visual information. Symmetrical artwork and other symmetrical visual images, such as two-dimensional images, can be encoded and later decoded using a mirror image of the encoded image, a decoding image, and overlaying the decoding image on the encoding image. An exemplary method for creating an encoded image from visual information and a method of decoding the encoded image includes manipulating an original image having one or more image elements to produce an encoded image and making a mirror image of this encoded image; a decoding image is overlaid on the encoded image for decoding. An image can have one or more image elements and each image element can be bisected and a portion of the image on one side of the bisection plane may be removed. Subsequently, a portion of the remaining bisected image can be reflected or flipped across the bisection plane to produce a mirror image of the reflected portion. Finally, the image elements can be moved with respect to each other to produce a reconfigured image.

An encoded image can be a bisected image, an image comprising one or more image elements that have a portion of the image element removed along a bisection plane.

An encoded image can be a reflected image, an image that comprises reflected portions, or portion of the bisected image that are reflected across the bisection plane. One or more portions of the bisected image can be flipped across the bisection plane to produce a reflected image having one or more reflected image portions. When an image has more than one image element, the reflected image portions can vary from side-to-side of the individual bisection planes. For example, a first image element can have a bisected image on the left side of the first bisection plane and a second image element can have a bisected image on the right side of the second bisection plane. Note that there can be any number of image elements and any number of bisection planes. Furthermore, the bisection planes need not be vertical or horizontal; they can be at any angle.

In one embodiment, an encoded image can also be transposed such that one or more portions (which can include all) of the image elements are moved toward or away from each other with respect to the bisection plane. Because moving image elements toward or away from each other with respect to the bisection plane can degrade the quality of a resulting decoded image, it is preferable that if such movements of image elements occur, in one embodiment, the movements are preferably not significant—for example, preferably not more than about 10% of the image is moved and/or image elements are preferably not moved more than 10% of a total width of the original image element. Although, in some embodiments, a resulting decoded image can still provide desirable results even if more than 10% of image elements are moved and/or even if image elements are moved by more than 10% of the total width of the original image element. An encoded image can also be an embellished image having one or more embellishments added to the image after bisection.

In one embodiment, a final encoded image can be decoded by utilizing a mirror image of the encoded image, a decoding image. The decoding image can be overlaid on the encoded image to decode the encoded image, wherein initial image elements of the original image pop out. The decoding and encoded images can be moved with respect to each other in an overlaid configuration until the original image elements can be recognized. This can be done manually, by producing a decoding image and overlaying it, or by the use of software. An encoded image can be produced on a display or projected, and a decoding image can be produced and displayed thereover to decode the original image elements. Software can automate this function by moving the decoding image with respect to the encoded image to find bisection planes and mirror images or transposed portions of image along this or these planes. Upon detection of a mirror or transposed image portion, software can reorient the image portion to create the original image, or this may be done manually.

Encoded images placed in sequential proximity can create the illusion of motion when decoded in succession. For example, when a user moves the decoding image in an overlaid format with respect to the encoded image, it can appear to produce moving images.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
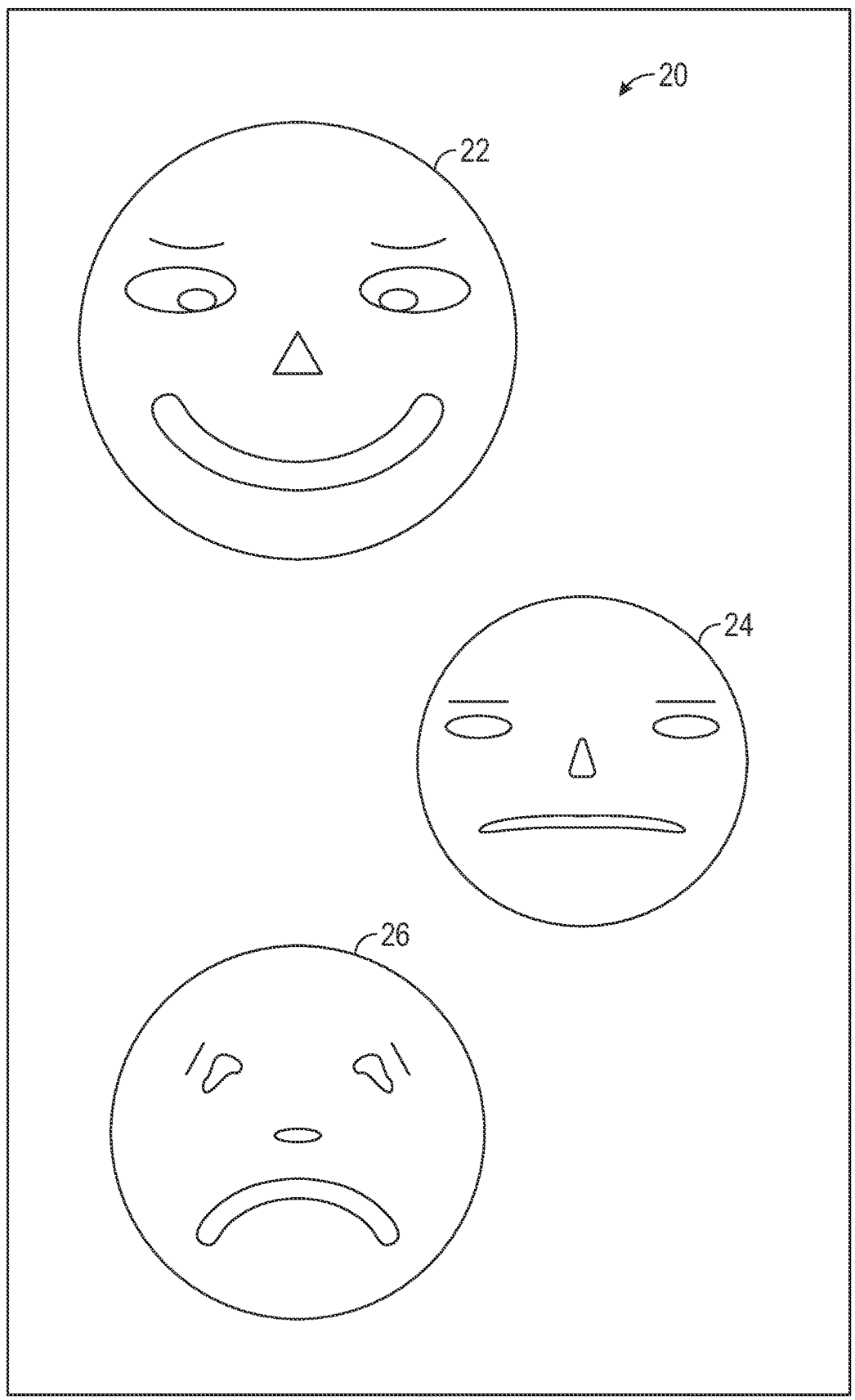
FIG. 1 is a drawing which illustrates an original set of images: in this example, the original set of images is formed from three distinct image elements that include a happy face, a neutral face, and a sad face.
Figure 2:
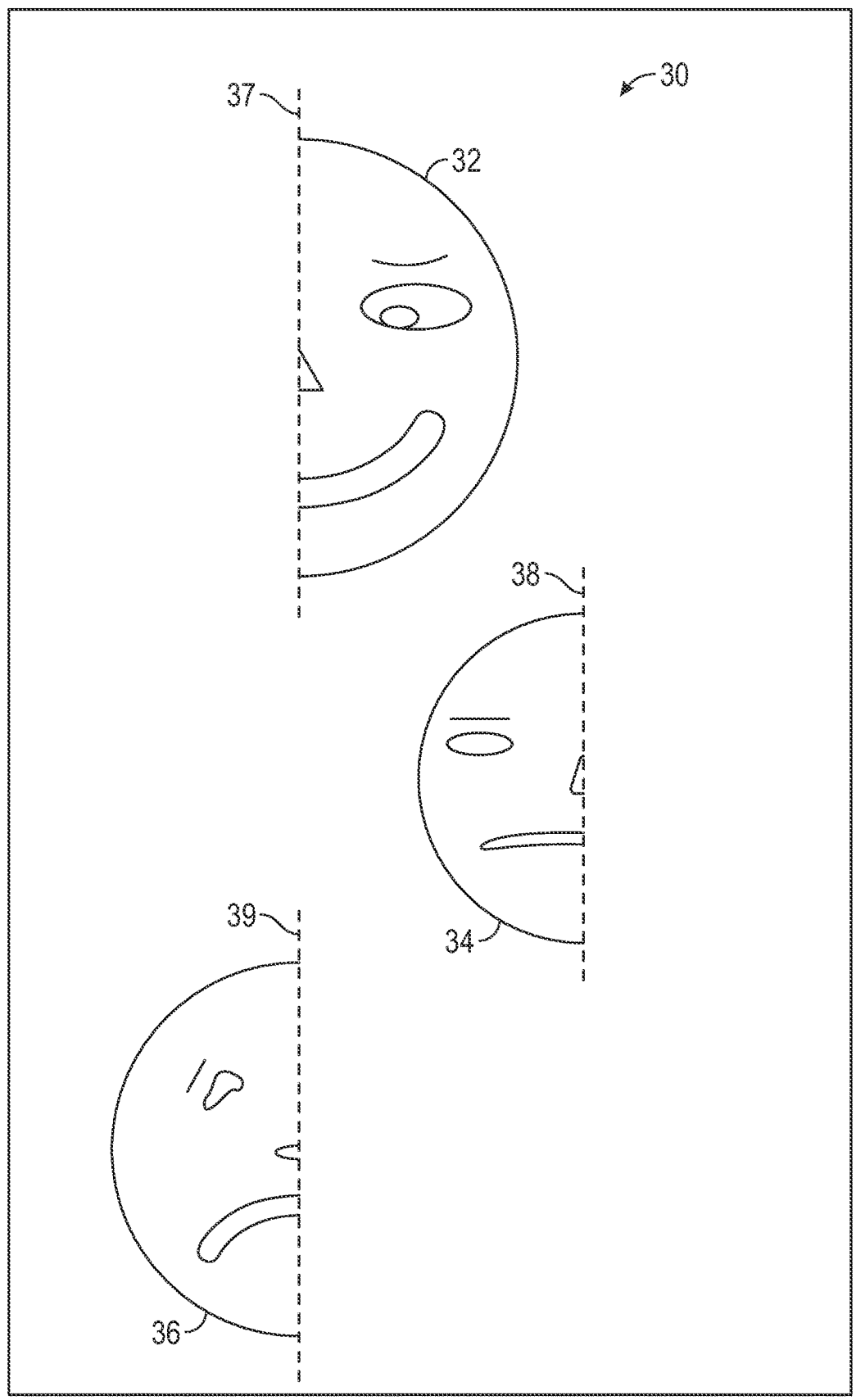
FIG. 2 is a drawing which illustrates the three image elements of FIG. 1, after each of the three image elements are bisected along a plane of symmetry of each image element and wherein the portion of each image element that lies on one side of the plane of symmetry has been removed.

Referring now to FIGS. 1 and 2, an exemplary original image set 20 which comprises three image elements, which in these illustrative drawings are depicted as three distinct faces. The first image element 22 is illustrated as a large smiley face, the second image element 24 is illustrated as a medium sized neutral face and the third image element 26 is illustrated as a smaller frowned face. In practice, any desired images, or portions thereof, could be used as image elements. In one embodiment; original image set 20 can comprise any desired number of image elements. Although the original image set 20, can comprise as few as a single image element, more desirable results can be obtained when image set 20 comprise a plurality of image elements.

As illustrated in FIG. 2, half-image-element set 30 is preferably formed by bisecting each image element in original image set 20 along their respective planes of symmetry and removing one side of each image element. Although in the example of image elements that are used in the drawings of the instant application, the respective planes of symmetry are substantially vertical, they need not be. Instead, the planes of symmetry for each image element can be positioned in any orientation or angle, as long as the image is symmetric about that plane of bisection and the decoder and original bisection planes align. Some deviation from the plane of symmetry or from an image that is somewhat lacking in symmetry can be tolerated but the resultant decoded image becomes more difficult to read with greater deviation. Also note that bisection planes can be formed from a plurality of different planes that can vary in orientation within a single bisected image. For example, if a particular image is symmetric about a curve, jagged line segment, some other shape, or combination thereof, then the term "plane of symmetry", as used throughout this application, is intended to include the curved or jagged series of line segments. Because embodiments of the present invention can provide desirable results when images are used that are substantially symmetric, the term "plane of symmetry", as used throughout this application" is also intended to include a plane of substantial symmetry (i.e. a plane or series of line segments or curves or other shapes, or combinations thereof about which an image is at least substantially similar. As seen in the example of FIG. 2, the removal of the portion of the first image element to the left of first plane of symmetry 37 produces first bisected image element 32—in this example, the right side of the bisected image element was elected to be retained. The removal of the portion of the second image element to the right of second plane of symmetry 38 produces second bisected image element 34—in this case, the left side of the bisected image element was elected to be retained. The removal of the portion of the third image element to the left of third plane of symmetry 39 produces third bisected image element 36—in this case the left side of the bisected image element was elected to be retained. Note that the bisected image element can be retained from either side of each plane of symmetry. Thus, either side of the image element can be selected for retention and this selection can be made by a person, made by a computer, made via some predetermined criteria or algorithm, or done randomly.

Figure 3:
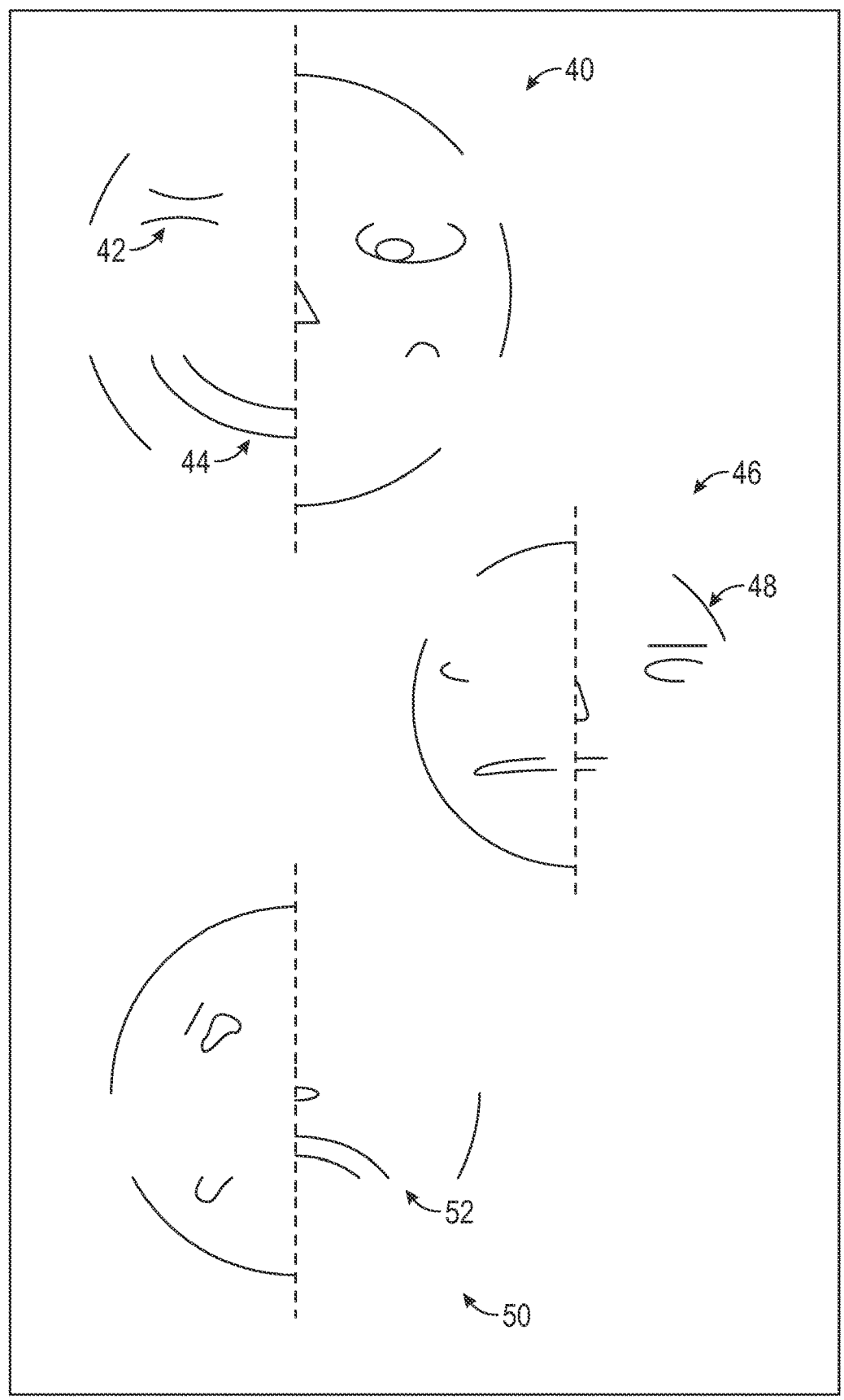
FIG. 3 is a drawing which illustrates the resulting reflected bisected image elements after the image elements of FIG. 2 have had portions of each reflected across the plane of symmetry of its respective image.

As illustrated in FIG. 3, a reflected bisected image element can be formed for one or more of the image elements by removing and reflecting one or more portions thereof across its respective plane of symmetry. For example, in FIG. 3, reflected bisected image element 40 has been formed by removing and reflecting across its plane of symmetry 37 (see FIG. 2) a first reflected portion 42, which in this example comprises an eyebrow, and a second reflected portion 44, which includes a portion of its mouth. Likewise, reflected bisected image element 46 has been formed by removing and reflecting across its plane of symmetry 38 (see FIG. 2) a first reflected portion 48, which includes a portion of the image that includes its eye, eyebrow, and nose. Reflected bisected image element 50 has been formed by removing and reflecting first reflected portion 52, which includes a portion of the mouth and nose.

Although the example in FIG. 3 shows one or two removed and reflected portions for each image element, desirable results can be achieved when some or all of the drawings do not have any removed and reflected portions. Likewise, desirable results can also be achieved when one or more of the image elements have numerous portions, which can optionally be small, medium, large, or a combination thereof, removed and reflected. Thus, the removed and reflected portions, if any are used, do not need to be large sections of the bisected image element; some or all or none of the removed and reflected portions can be very small or can be any desired size or shape. Still further, although the particular examples that are illustrated in the figures show the use of large sections of the drawing that extend all the way from the plane of symmetry to the outer edge of the image element, such an arrangement is not required and, in fact, any shape or size of the bisected image element can be removed and reflected—for example, a small portion that is shaped like a star (or any other shape) and which is distant from the line of symmetry can be removed and reflected. One or more of the removed and reflected portions can even be so small as to be individual pixels of the bisected image element.

Figure 4:
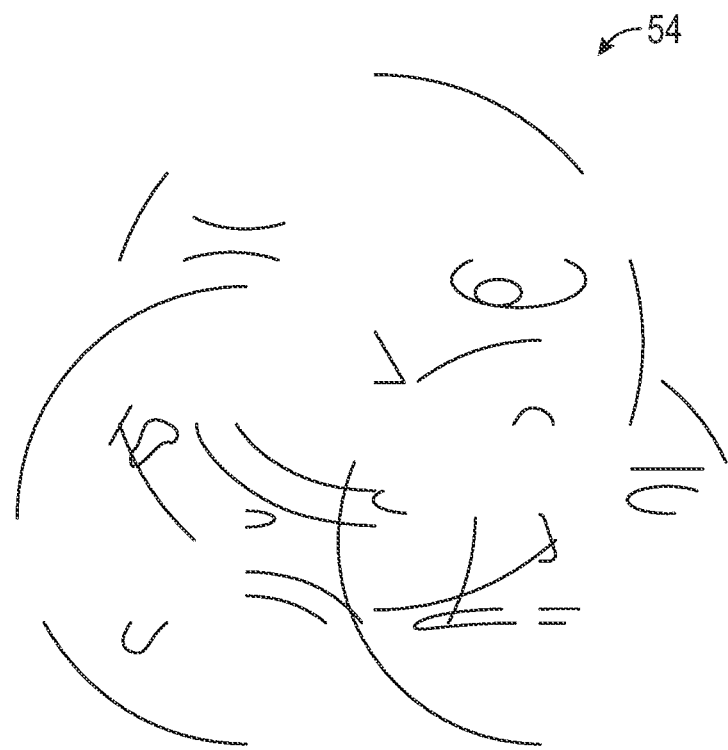
FIG. 4 is a drawing which illustrates the drawing of FIG. 3 wherein the lines of symmetry of each of the image elements have been arranged such that they are parallel with one another and so that the images are allowed to partially overlap one another, thus creating a composite image.

As illustrated in the embodiment of FIG. 4, composite image 54 is preferably formed by moving one or more of reflected bisected image elements 40, 46, and/or 50 (see FIG. 3) such that they are grouped into a single image composite image 54. In one embodiment, one or more reflected bisected image elements can overlap, and/or partially overlap another of the reflected bisected image elements. Thus, in one embodiment, one or more of bisected image elements 40, 46, and/or 50 are preferably created on a transparent substrate or with a transparent background such that placing a portion of one reflected bisected image element atop another will not cause the underlying reflected bisected image element to be obscured by the background of the overlying reflected bisected image element. Optionally, the entirety of or a portion of the image element can be at least partially transparent. It is not essential that all or any of the reflected bisected image elements overlap one or more other reflected bisected image elements. Rather, desirable results can still be obtained by not overlapping some or all of the reflected bisected image elements. In one embodiment, the line of symmetry of each image element is preferably aligned at least substantially parallel with one another. In the case of the example illustrated in FIG. 4, each plane of symmetry is substantially perpendicular with the bottom edge of FIG. 4. In one embodiment, one or more reflected bisected image elements can be grouped together with one or more reflected image elements to form composite image 54, in other words, not all image elements need to have portions thereof reflected. Rather, some image elements can optionally be merely bisected and grouped with one or more reflected bisected image elements. Still further, in one embodiment, composite image 54 can be formed entirely from bisected image elements and thus need not include any reflected bisected image elements.

Figure 5:
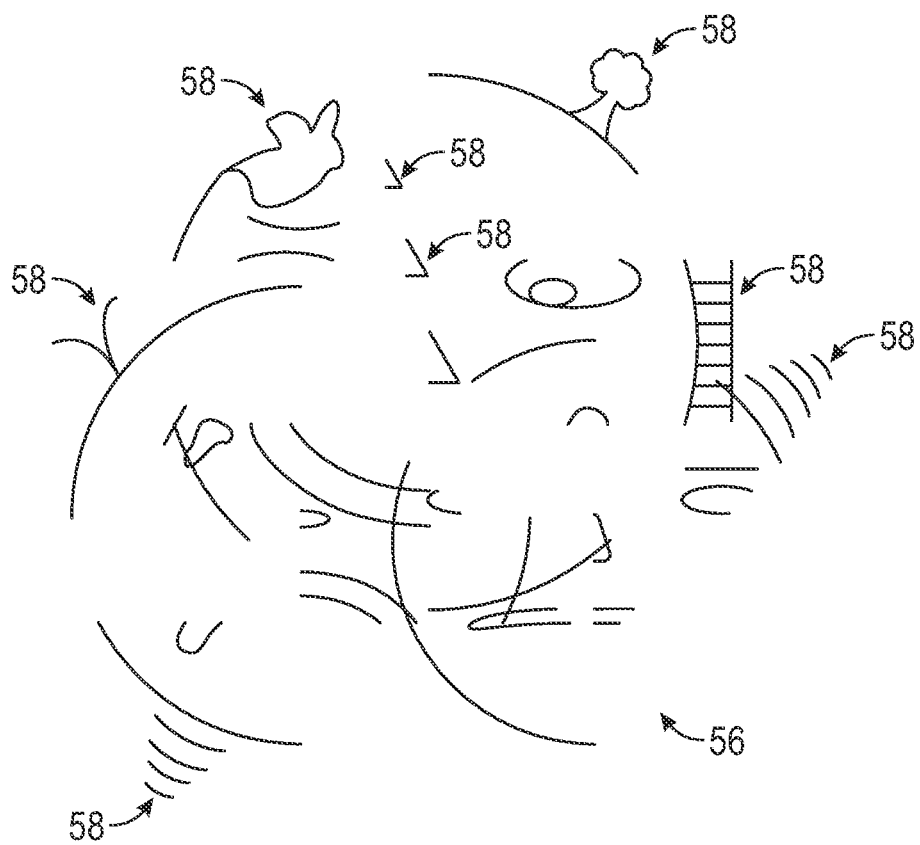
FIG. 5 is a drawing which illustrates the drawing of FIG. 4 wherein embellishments have been added to the composite image to provide an encoded composite image.

As illustrated in FIG. 5, encoded image 56 can optionally include adding embellishments 58 to composite image 54. Although in this example, embellishments 58 are added to composite image 54, embellishments 58 can also or otherwise be added at any one or more steps before composite image 54 is created. For example, in one embodiment, embellishments 58 can be added when the image elements are first bisected, and/or embellishments 58 can be added after the reflected bisected image elements are formed. Thus, in one embodiment, composite image 54 can optionally be formed by any combination of bisected and/or bisected and reflected image elements, and any of those image elements can optionally comprise one or more embellishments 58.

Figure 6:
FIG. 6 is a drawing which illustrates a decoding image which is formed by creating a mirror image of the encoded composite image of FIG. 5; in this particular example, the decoding image has been rendered on a transparent background.
Figure 7:
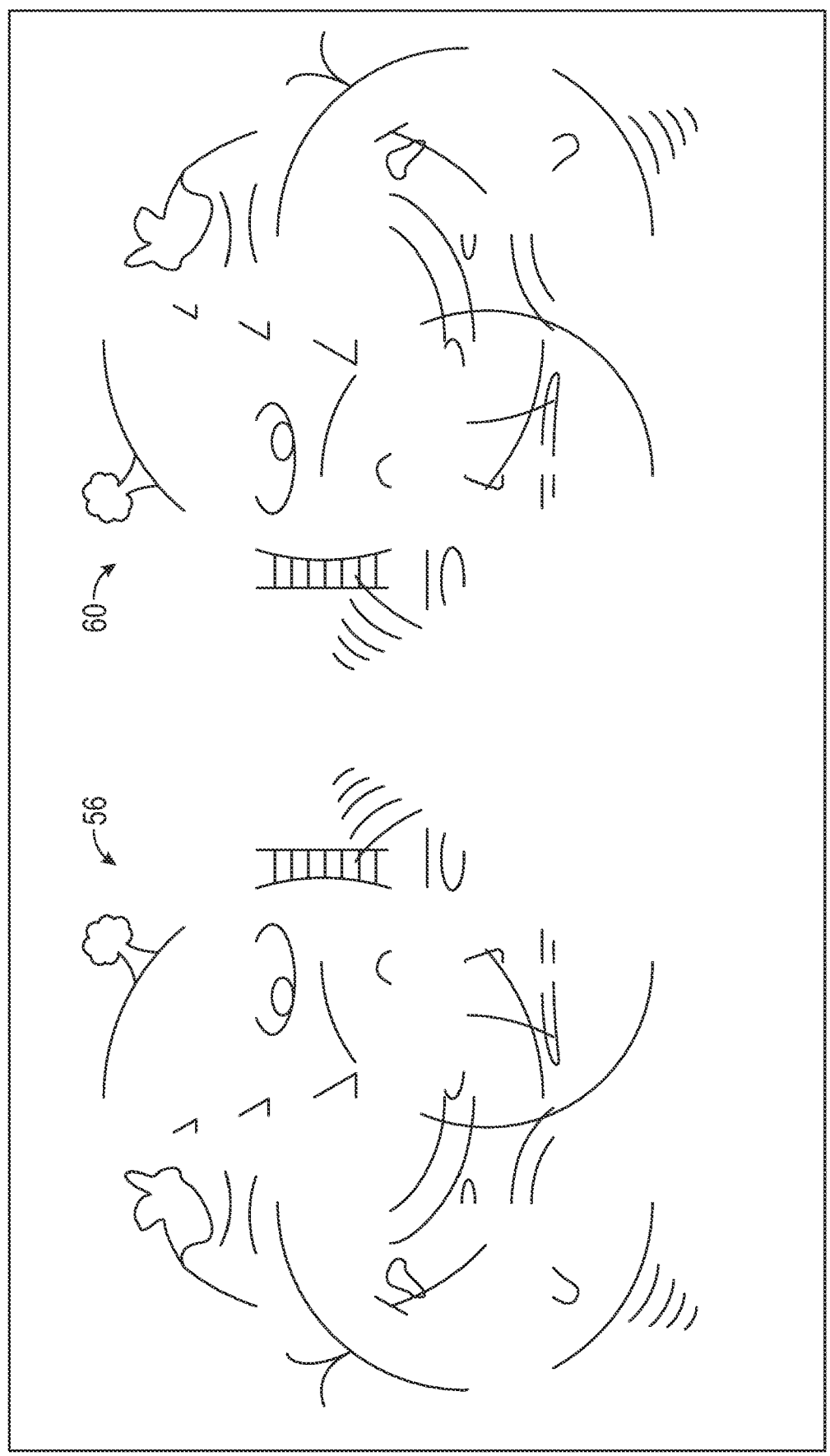
FIG. 7 is a drawing which illustrates the encoded composite image of FIG. 5 on the left and the decoding image thereof (FIG. 6) on the right.

After encoded image 56 is formed, a mirror image of it is preferably obtained. The mirror image of encoded image is decoding image 60 and can be used to decode encoded image 56. In FIG. 6, decoding image 60 has been formed by making a mirror image of encoded image 56. FIG. 7 illustrates encoded image 56 on the left and its decoding image 60 on the right. At least one of decoding image 56 and/or encoding image 60 are preferably formed with an at least partially transparent background or with the entirety of the decoding image and/or the encoding image at least partially transparent such that one of the two images can be placed atop the other image and the background of the top-most image will not obscure the underlying image.

Because encoded image 56 will only reveal the original image element when the plane of symmetry of the reflected bisected image element (of encoded image 56) is aligned with and placed directly atop (or beneath or otherwise digitally aligned with) the plane of symmetry of its reflection (in decoding image 60), in one embodiment, decoding image 60 can be made to reveal none of the original image elements, all of the original image elements, one of the image elements, or some of the image elements. For example, as illustrated in FIG. 8, the planes of symmetry of the reflected bisected image element 50 is aligned and directly beneath its respective plane of symmetry in the decoding image 60, in FIG. 8, only original image element 26 is revealed.

FIGS. 9-16 were created by slightly moving decoding image 60 to the right in a step-wise fashion. Although it is virtually impossible to identify what portion of the image is attributable to encoded image 56 and what portion is attributable to decoding image 60, the amount of relative movement between decoding image 60 and encoded image 56 can be identified by comparing the relative spacing between the tree-like embellishment at the top of the figures as well as by comparing the relative spacing between the ladder-like embellishments near the sides of the images as those embellishments progressively move together through the series of images of FIGS. 8-16.

Figure 8:
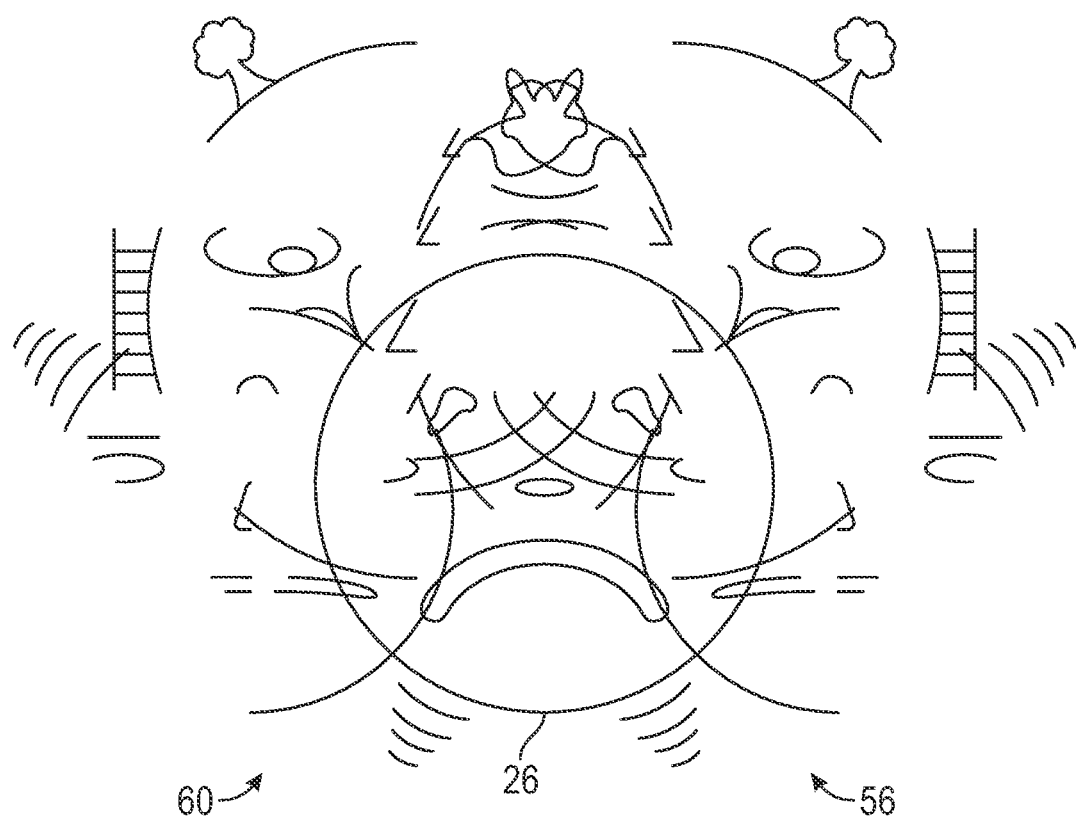
FIG. 8 is a drawing which illustrates the encoded composite image of FIG. 5 with the decoding image of FIG. 6, on transparent background, placed thereon and with their respective planes of symmetry aligned at least substantially parallel with one another; in this image the plane of symmetry of the sad face is aligned with and directly atop the line of symmetry of its respective sad face decoding image, thus resulting in the sad face image element being decoded.
Figure 9:
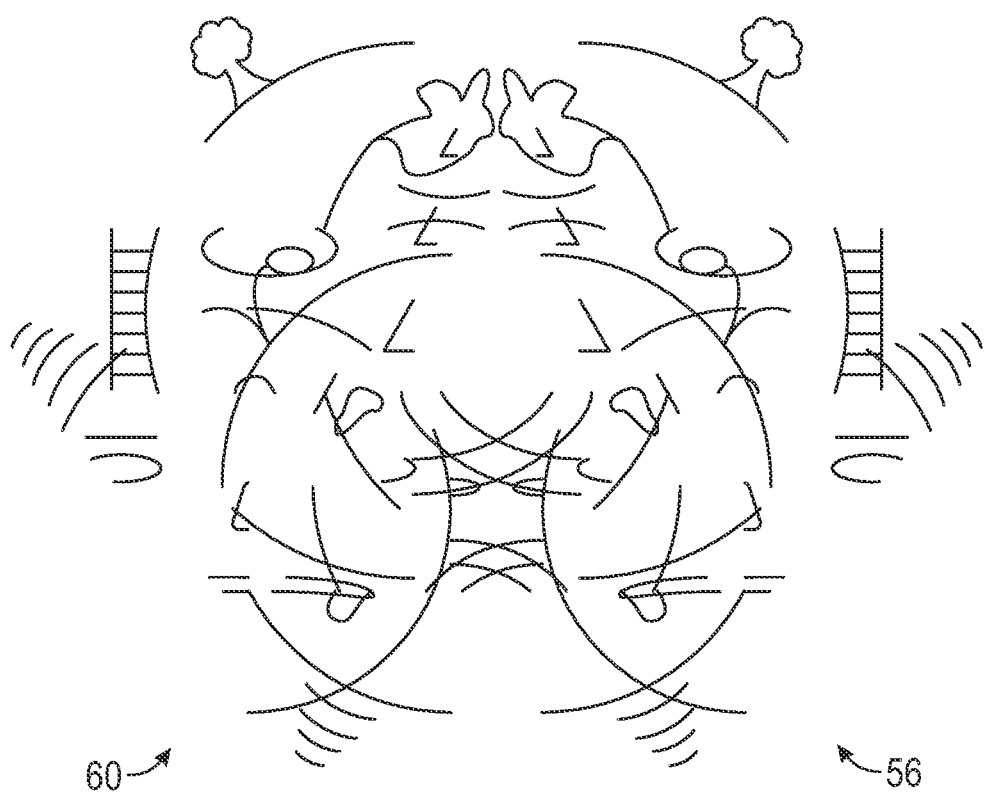
FIGS. 9, 10, 11, 12, 13, 14, 15, and 16 respectively illustrate the drawing of FIG. 8 wherein the partially-transparent decoding image is progressively slid to the right with respect to the encoded composite image, thus resulting in the happy face image element being decoded in FIG. 11 and the neutral face image element being decoded in FIG. 16.

In FIG. 9, decoding image 60 has been slid a small amount to the right with respect to encoded image 56 and with respect to its placement in FIG. 8. As used throughout this application, when describing moving one item with respect to another it is to be understood that either item can be held still while the other is moved or that both of the items can be moved so as to create a relative motion between the two. Accordingly, the plane of symmetry of reflected bisected image element 50 is no longer aligned with and directly beneath its respective plane of symmetry in decoding image 60. Thus, original image element 26 is no longer visible. None of the planes of symmetry of reflected bisected image elements 40 or 46 are aligned in the placement of decoding image 60 in FIG. 9 and thus original image elements 22 and 24 are also not decoded in this FIG. 9.

Figure 10:
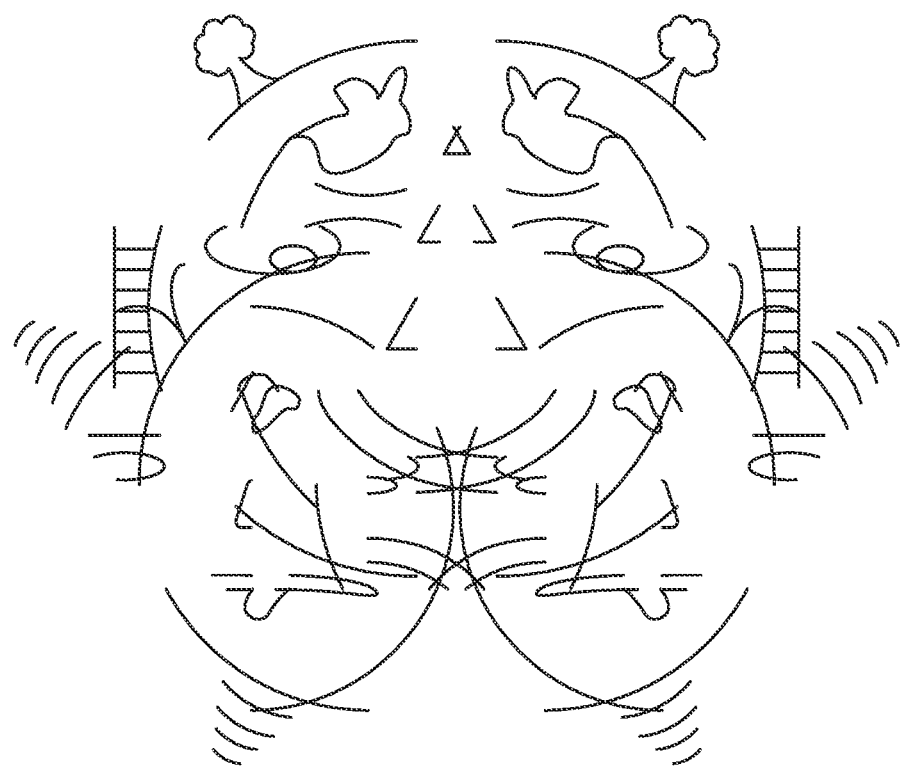
Figure 11:
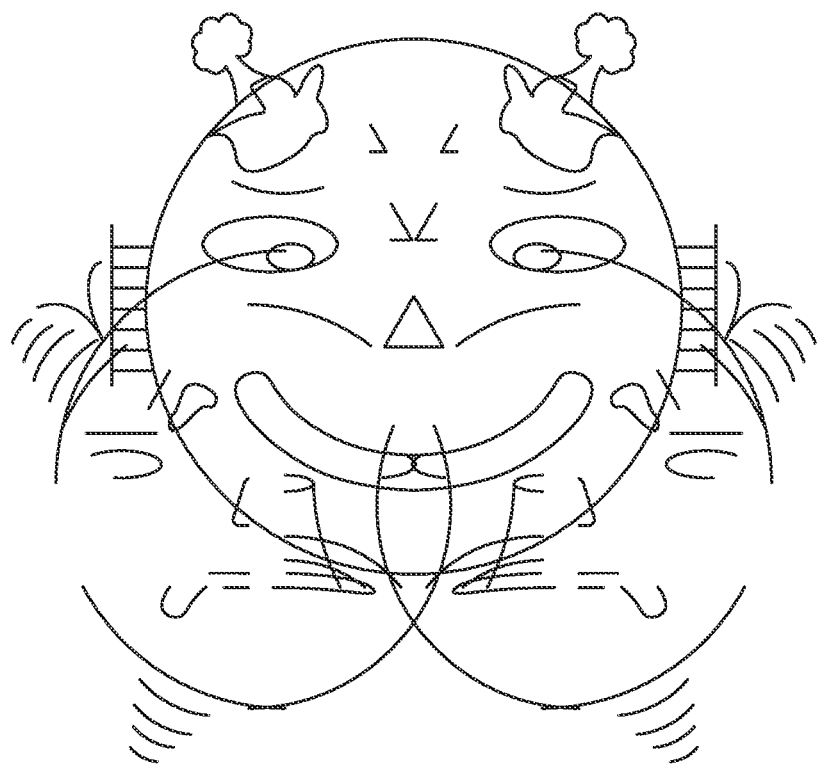
Figure 12:
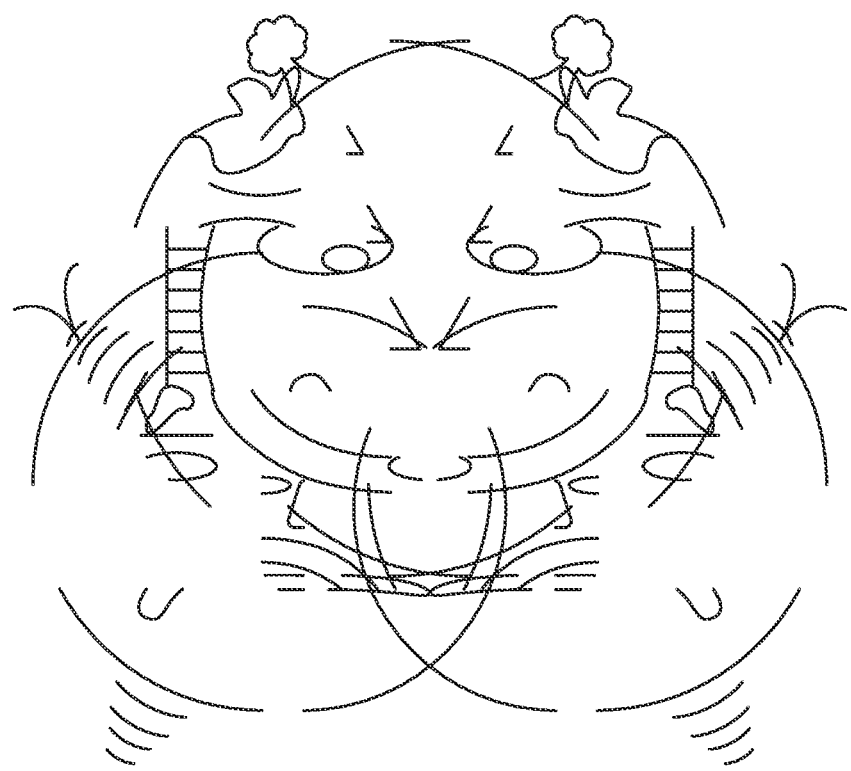
Figure 13:
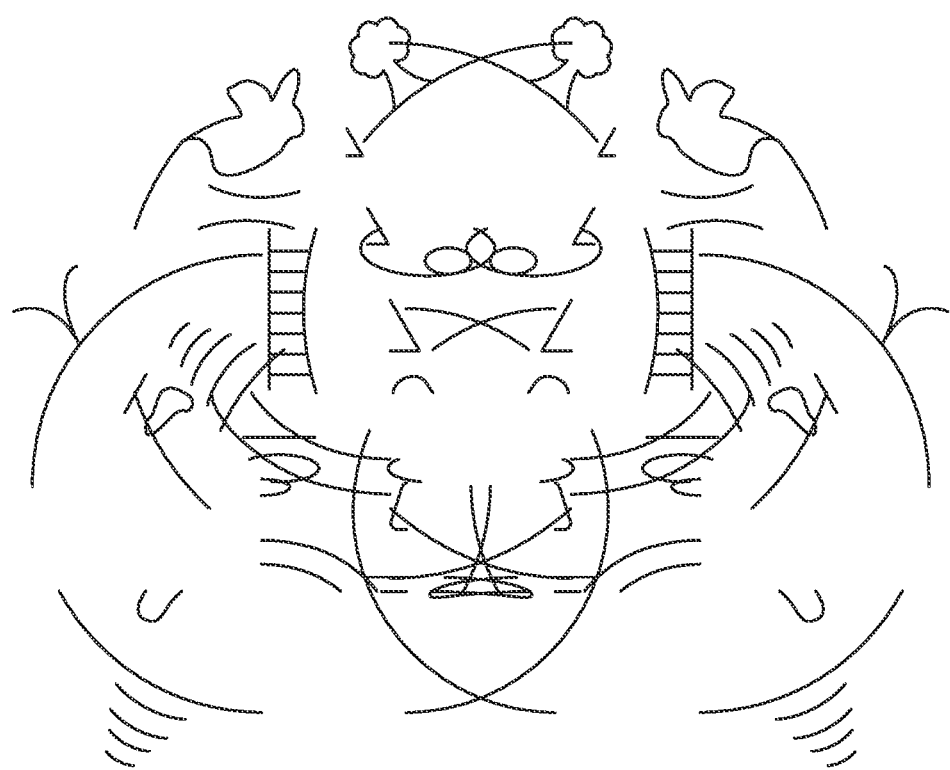
Figure 14:
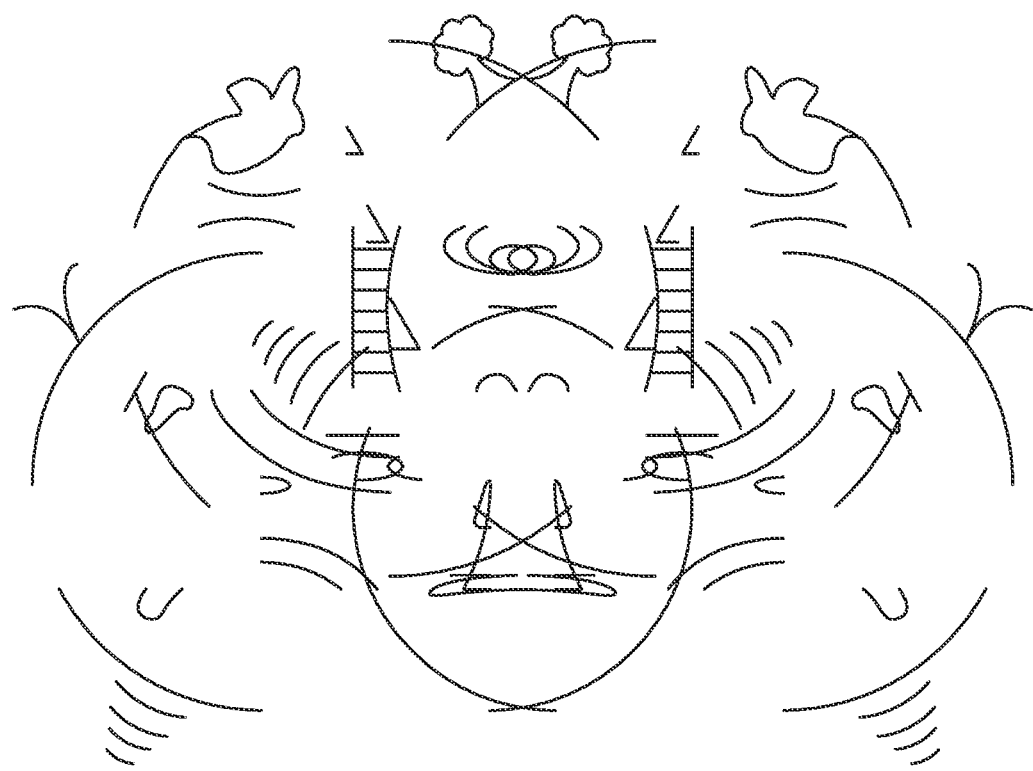
Figure 15:
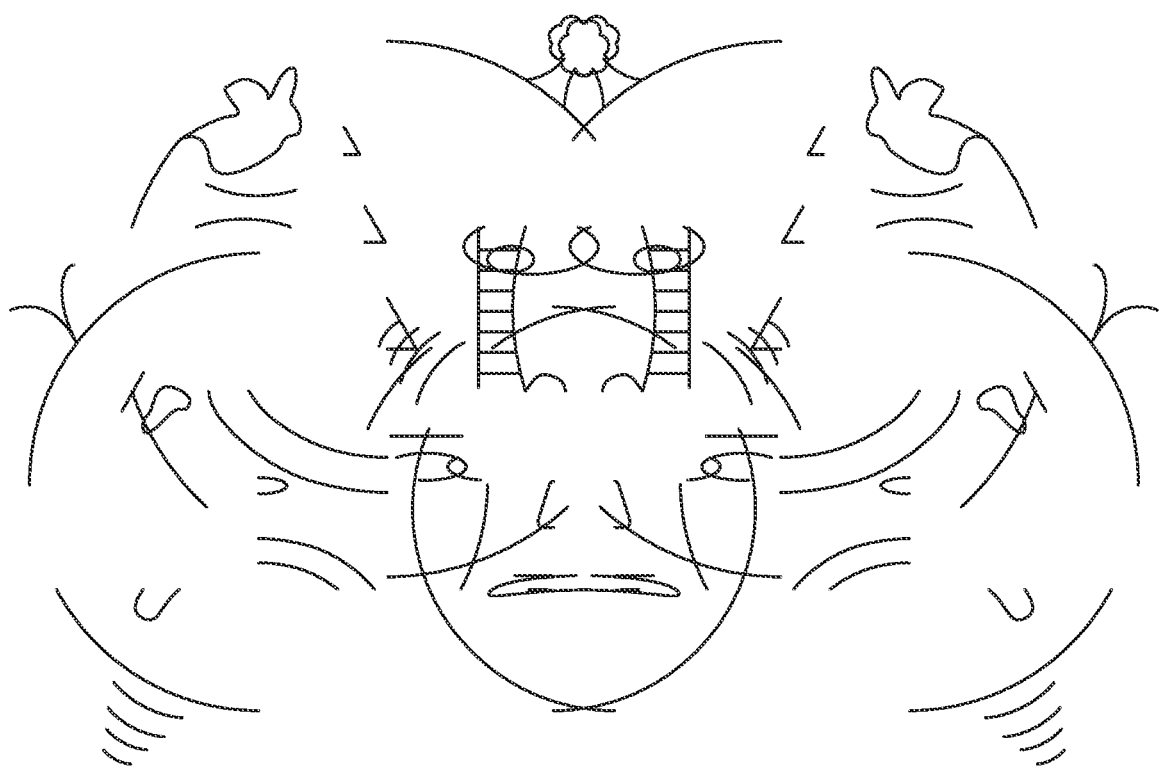

In FIG. 10 decoding image 60 has again been slid another step to the right with respect to encoded image 56 and again, none of the original image elements are revealed. However, in FIG. 11, wherein decoding image 60 has again been slid yet another step to the right with respect to encoded image 56, the plane of symmetry of reflected bisected image element 40 is now aligned with and is directly under the respective line of symmetry of its reflection of decoding image 60, thus revealing original image element 22.

In FIGS. 12, 13, 14, and 15, decoding image 60 is progressively stepped to the right with respect to encoded image 56. Although very different images result in each of those figures, because none of the planes of symmetry of reflected bisected image elements align directly with their respective plane of symmetry in decoding image 60, none of the original image elements are produced.

Figure 16:
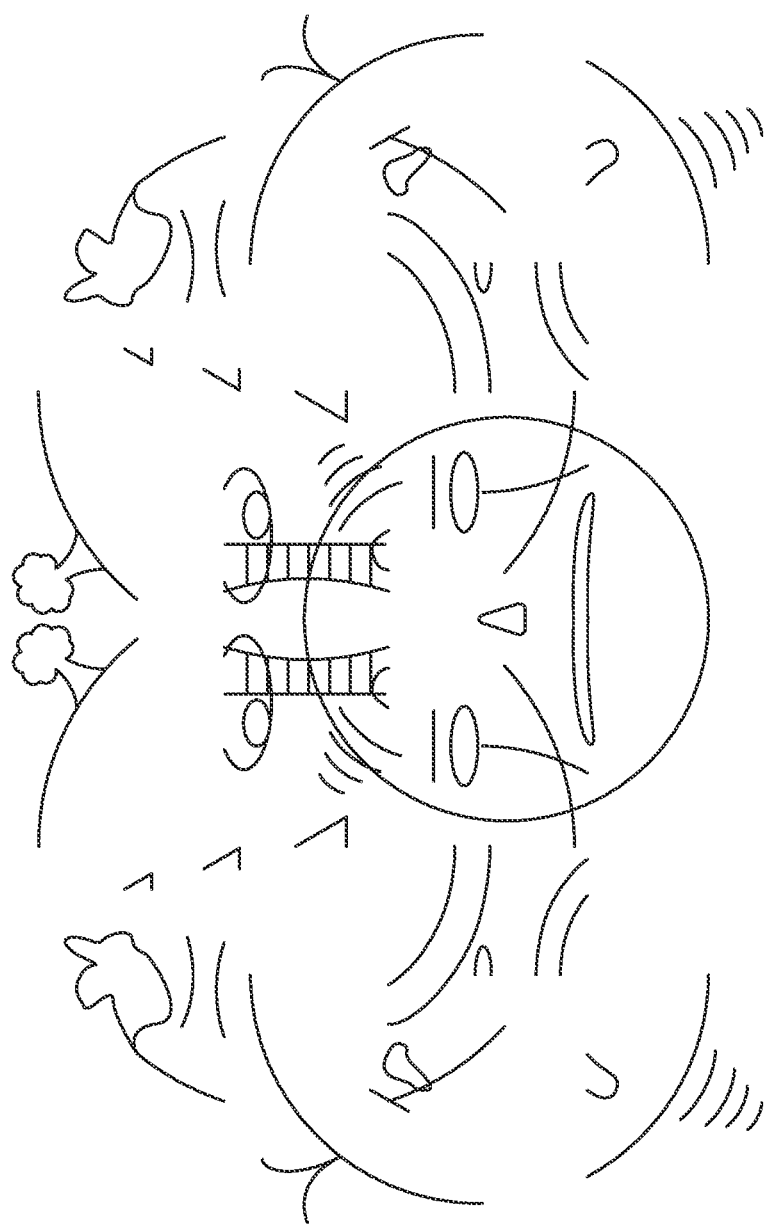
Figure 17:
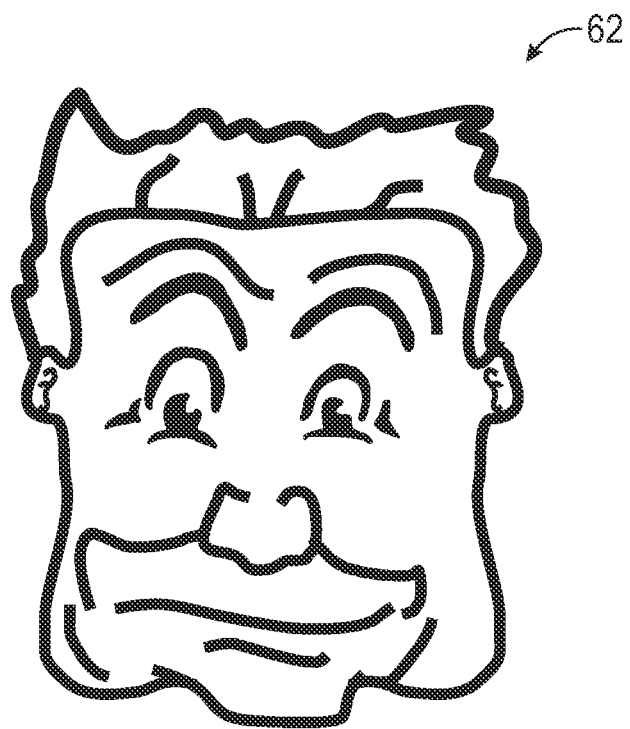
FIG. 17 is a drawing that illustrates an image element which is a happy face.
Figure 18:
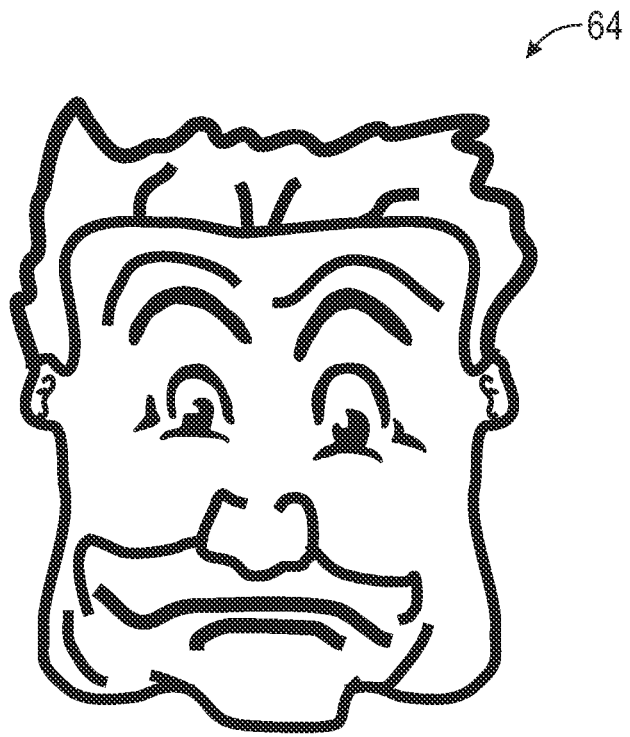
FIG. 18 is a drawing that illustrates an image element which is a sad face.
Figure 19:
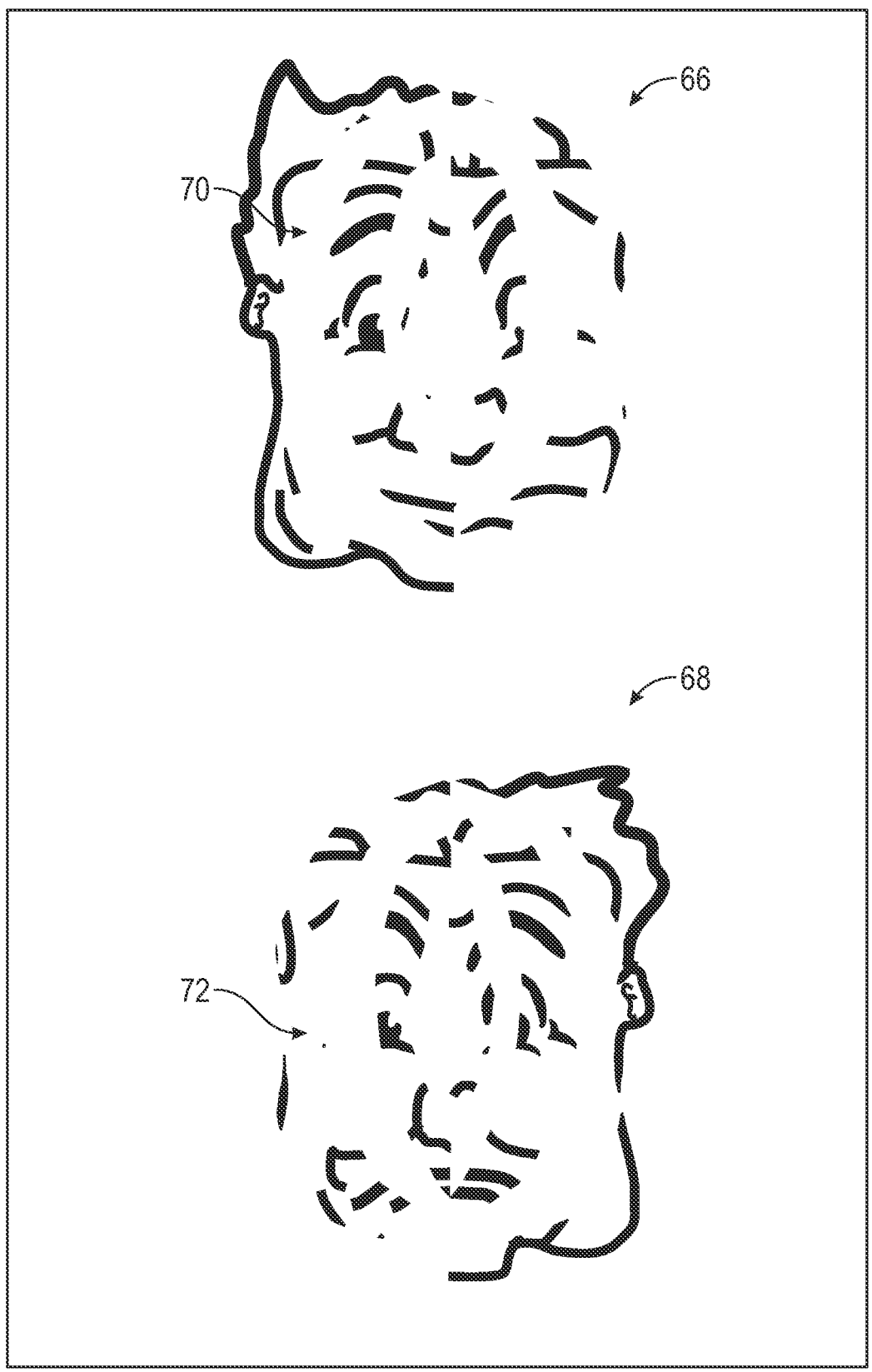
FIG. 19 is a drawing which illustrates halves of the image elements of FIGS. 17 and 18 which have been bisected along their respective line of symmetry and which have been encoded by reflecting a similar geometric pattern about the line of symmetry of both.
Figure 20:
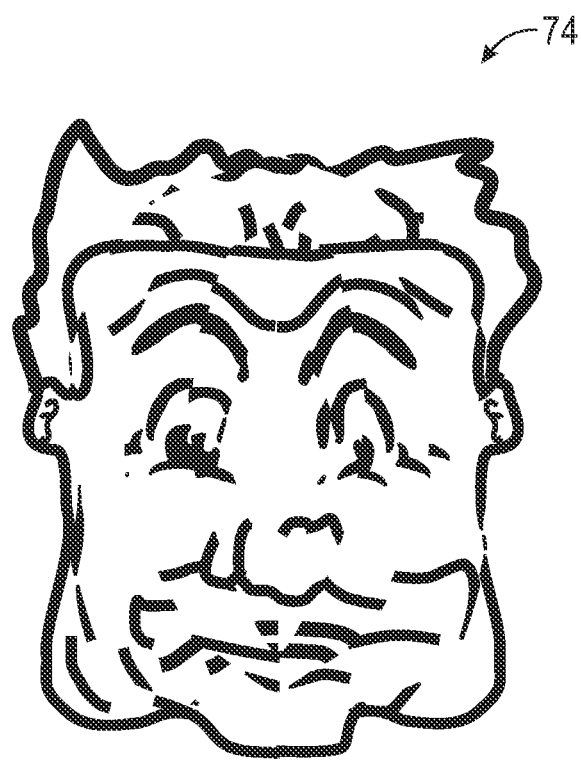
FIG. 20 is a drawing which illustrates the two encoded halves of image elements of FIG. 19 which have been slid together such that their lines of symmetry are aligned and positioned such that one line of symmetry is positioned atop the other.

In FIG. 16, decoding image 60 has again been stepped to the right with respect to underlying encoded image 56, and now the plane of symmetry of reflected bisected image element 46 is directly aligned with its respective plane of symmetry in decoding image 60, thus revealing original image element 24.

The foregoing figures illustrate an embodiment of the present invention where a maximum of only one of the original image elements are revealed at a time. Embodiments of the present invention, however, are capable of revealing a plurality of original image elements at any one time or even all of the image elements at any one time. In order to accomplish such simultaneous revealing of two or more image elements, the planes of symmetry of those two or more image elements are aligned with the planes of symmetry of each other when composite image 54 is created (for example, when creating the image of FIG. 4).

Because the order and number of original image elements that are revealed are determined based on the placement and arrangement of reflected bisected image elements when forming the composite image (and the placement and direction of movement of the decoding image also determines when the planes of symmetry align), in one embodiment, the planes of symmetry of the reflected bisected image elements can be positioned and arranged so that when the decoding image is moved, the original image elements come into view in an order that appears to create motion, including but not limited to animated motion pictures. Thus, in one embodiment, sliding the decoding image with respect to the encoded image can create a sense of motion or an animation.

For embodiments of the present invention wherein a composite image is formed and reference is made to aligning one or more planes of symmetry, it is to be understood that the planes of symmetry are intended to be arranged to lie within the same plane. And, while such planes of symmetry lying within the same plane can be positioned such that the portions of the associated image elements are completely or partially overlapped, in one embodiment, the associated image elements can be arranged (for example by sliding along that plane of symmetry) such that one or more of the associated image elements are not overlapping one or more of the other image elements. For embodiments of the present invention wherein reference is made to aligning a plane of symmetry with a plane of symmetry of a decoding image, such alignment is preferably arranged such that the planes of symmetry are within the same plane and such that the image or image element of the associated line of symmetry is juxtaposed with the other image or image element, thus recreating one or more of the original image elements.

In one embodiment, an encoded image can only be decoded with a properly-constructed decoding image. Thus, in one embodiment, false-decoding images can be provided which appear, at first blush, to be a decoding image but which is not actually formed as a mirror image of the encoded image. In one embodiment, the steps of an embodiment of the present invention can be carried out with physical pieces of paper, drawing utensils, transparencies, and tape. Alternatively, however, embodiments of the present invention can be carried out via computer software which digitally manipulates images and which performs the foregoing steps. In this embodiment, some or all of the steps described above can comprise computer software that causes a computer to perform each such step. Although desirable results can be obtained with a desktop or other large computer or computer terminal operating on software contained on a computer or stored on or operating in the cloud, in one embodiment, the software can optionally be provided in the form of an application which operates on a smartphone or other mobile device.

Referring now to FIGS. 17-20, as with other embodiments, an encoded image can be formed from a plurality of images elements 62 and 64. Like the foregoing embodiments, any desired number of image elements can be used. Image elements 62 and 64 are most preferably each symmetric about a plane, or at least substantially symmetric. After bisecting image elements 62 and 64 along their respective lines of symmetry, one or more portions of the image are cut and reflected about the image element's line of symmetry (see FIG. 19) to produce encoded image elements 66 and 68 (also referred to herein as reflected bisected image elements). Most preferably the geometric pattern(s) that are cut and reflected are mirror images of the same between encoded image elements 66 and 68. (For example, encoding pattern 70, used in the example illustrated in these figures, uses right-opening curved cuts for on encoded image element 66 and encoding pattern 72 uses left-opening curved cuts for encoded image element 68.) Of course any desired shape and any desired number of shapes, which can be the same or which can be different, can be used to form encoding patterns 70 or 72. Once encoded image elements 66 and 68 have been formed, each image element is positioned such that their respective planes of symmetry are aligned and disposed atop one another such that encoded composite image 74 is formed, which is most preferably an interdigitated image. As used throughout this application, when referring to placing items atop one another it is to be understood that any one of the items can be placed atop any of the other items but most preferably an at least partially transparent Item is on the top so that the underlying image is at least partially visible through the top image. For such embodiments wherein the composite image is an interdigitated image, although the plurality of reflected bisected image elements are preferably aligned to form composite image 74 without visible portions of the reflected bisected image elements actually overlapping one another, as used throughout this application, the term "overlapping" is intended to include such interdigitated images. In one embodiment, the geometric pattern used to encode each of the image elements can be slightly different from one another and/or when forming encoded composite image 74, the various planes of symmetry of the individual image elements need not be precisely aligned. In such cases, gaps will be formed in the resulting encoded composite image. Optionally, such gaps can simply remain unfilled, although desirable results can be obtained when such gaps are filled. Optionally such gaps can be filled by any of numerous fill methods, which can include one or more of interpolation of surrounding non-gap pixels, color fill, freehand fill, neighbor pixel sample fill; or any other manner of filling a gap. As with the foregoing embodiments, encoded composite image 74 can be decoded by creating a mirror image of it, applying a degree of transparency to encoded composite image 74 and/or its mirror image, and sliding the mirror image with respect to composite image 74. When composite encoded image 74 has been formed by encoded image elements that are aligned with their planes of symmetry directly atop one another, all of the image elements will be revealed simultaneously. In one embodiment, wherein encoded composite image 74 is formed by somewhat misaligned planes of symmetry of the encoded image elements, as the mirror image of the encoded composite image is slid with respect to encoded composite image 74, the original image elements 62 and 64 will reveal themselves at slightly different times. As with foregoing embodiments, this embodiment also can be performed physically and/or electronically, including via a computer, smartphone, tablet or other computational device using software that is stored on the device or on the cloud or which software is operated on the cloud, for example via software as a service.

Embodiments of the present invention can be used to create new works of visual art and/or to decode artworks that have been created for decoding as described herein, By creating an animation as previously described, a user can use embodiments of the present invention to give an effect of creating a series of images that appear and disappear in sequence and can use this effect to tell a narrative and/or give the impression of motion. In one embodiment, the original image elements can be provided on a substrate or with a background that is opaque, translucent, at least partially transparent, or wherein the background is simply removed or otherwise non-existent, and/or some combination thereof. Optionally, however, all or a portion of the entirety of the original image elements can be at least partially transparent. In one embodiment, the decoding image can be provided on a substrate or with a background that is at least partially transparent or translucent and/or wherein the background is simply removed or otherwise non-existent or some combination thereof, Optionally, however, all or a portion of the entirety of the decoding image elements can be at least partially transparent, Most preferably, however, in one embodiment at least one of the decoding image and/or the encoded image are provided on a substrate or with a background that is at least partially transparent or translucent, or wherein the background is simply removed or otherwise non-existent, and/or some combination thereof or wherein the entirety or a portion of either or both the decoding image and the encoded image can be at least partially transparent.

In one embodiment, the planes of symmetry of the one or more image elements within the encoded image can be arranged in any desired orientation, including with one or more image elements arranged such that their plane of symmetry is in a direction different from that of one or more other image elements. Thus, in one embodiment, the encoded image can be created such that the decoding image can be slid and/or rotated in any desired direction, including but not limited to up-to-down, down-to-up, right-to-left, left-to-right, clockwise, counterclockwise, diagonally or a combination thereof, with respect to the encoded image, in order to decode the encoded image. In one embodiment, bisected images can be arranged with bisection planes oriented along a circular or angular pathway, which can optionally be described by polar coordinates. The decoding motion in this case can be via a clockwise and/or counterclockwise rotation.

Embodiments of the present invention also include software that can present and/or view a decoded image. In one embodiment, this can be accomplished by first obtaining an image (which can include taking a picture of, or otherwise capturing an image or an object—for example, optionally taking a photo with a smartphone or scanning the image on a scanner). Then, the image is preferably manipulated as described throughout this application. In one embodiment, moving the decoding image with respect to the encoded imaged can be accomplished automatically via the software and/or can be accomplished based on manual input from a user—for example, by a user sliding his or her finger or other input device to control placement and/or direction of movement of the decoding image with respect to the encoded image. In one embodiment, this can be accomplished via a smartphone application and the step of obtaining an image can include a user snapping a photo and/or initiating a screen-grab. In one embodiment, the software can be used to decode advertising, which has been encoded to include hidden images and/or text.

Optionally one, or more, or even all the steps of the invention can optionally be performed via a computer operating on software stored in tangible non-transitive storage medium. Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

In one embodiment, decoding an artwork or image can be used as a mechanism for assisting in authenticating the artwork or image and/or as a mechanism for the attribution of the artwork or image to an artist and/or as to assist in discrediting the attribution of an artwork to an artist, which can include assisting in spotting a fake or identifying an artwork or image that is improperly attributed to an artist. In one embodiment an image can be decoded by creating a mirror image of the image on a transparency and then placing the image below the transparency and moving the transparency to reveal encoded content. In one embodiment particularly, desirable results can be obtained by first placing a non-transparent mirror image of an encoded message, then placing the encoded image atop the non-transparent mirror image, then placing a mirror image that is disposed on a transparent substrate or is otherwise rendered at least partially transparent, atop the original encoded image. Then, the original encoded image can be slid about while the non-transparent mirror image and the transparent mirror image are held stationary with respect to one another. In one embodiment, the transparent mirror image is most preferably a partially transparent mirror image and has an opacity of about 20% to about 95% and more preferably has an opacity of about 40% to about 60% and most preferably has an opacity of about 50%. In one embodiment, this layered approach for decoding an image can be performed on a computer, tablet, smartphone or other electronic device via software.

The preceding examples can be repeated with similar success by substituting the generically or specifically described components and/or operating conditions of embodiments of the present invention for those used in the preceding examples. In one embodiment, the present invention can be used to reveal hidden images in photos, images, or drawings which are not intentionally encoded with hidden images. For example, in one embodiment, a mirror image of an unintentionally-encoded image can be obtained. The mirror image and/or the unintentionally-encoded image are preferably at least partially transparent and are then placed one-atop-another and then the two images moved with respect to each other to reveal hidden images. For example, a photo of clouds can be taken and then an at least partially transparent mirror image of the cloud picture is formed and placed atop the original image and then moved to reveal hidden images in the clouds.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USE keys, other removable drives, ROM, and firmware.

Embodiments of the present invention can include every combination of features that are disclosed herein independently from each other. Although the invention has been described in detail with particular reference to the disclosed embodiments, other embodiments can achieve the same results, Variations and modifications of the present invention will be obvious to those skilled in the art and it is intended to cover in the appended claims all such modifications and equivalents. The entire disclosures of all references, applications, patents, and publications cited above are hereby incorporated by reference. Embodiments of the present invention can be performed in a manner that does not include a merely mental process. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A method for revealing hidden images comprising:
   obtaining a physical substrate with an image disposed thereon;
   forming a mirror image of the image, wherein the image, the mirror image or a combination thereof is disposed on an at least partially transparent substrate;
   positioning the mirror image atop the image or positioning the image atop the mirror image; and
   moving the mirror image and/or the image with respect to one another until a hidden image is revealed.

2. The method of claim 1 wherein the image comprises an image of artwork.

3. The method of claim 1 further comprising decoding at least a portion of the image by aligning a plane of symmetry of the image with a respective plane of symmetry of the mirror image such that the plane of symmetry of the image and the plane of symmetry of the mirror image are aligned with one another.

4. The method of claim 1 wherein moving the mirror image and/or the image with respect to one another comprises gradually moving the mirror image and/or the image with respect to one another to sequentially reveal a plurality of hidden images.

5. The method of claim 1 wherein moving the mirror image and/or the image with respect to one another comprises moving the mirror image and/or the image with respect to one another to sequentially reveal a story told through a plurality of sequentially revealed images.

6. The method of claim 1 wherein moving the mirror image and/or the image with respect to one another comprises sliding the mirror image and/or the image in a straight line with respect to one another.

7. The method of claim 1 wherein moving the mirror image and/or the image with respect to one another comprises rotating the mirror image and/or the image with respect to one another.

8. Computer software stored on a non-transitory computer readable medium for revealing a hidden image, the non-transitory computer medium comprising:
   code obtaining an image from a user taking a photo and/or from a user causing an image to be scanned;
   code forming a mirror image of the image, wherein the image, the mirror image or a combination thereof is at least partially transparent;
   code positioning the mirror image atop the image or positioning the image atop the mirror image; and
   code moving the mirror image and/or the image with respect to one another in response to a manual input by a user and revealing the hidden image.

9. The computer software of claim 8 wherein code obtaining an image comprises code obtaining an image of artwork.

10. The computer software of claim 8 further comprising code aligning a plane of symmetry of the image with a respective plane of symmetry of the mirror image such that the plane of symmetry of the image and the plane of symmetry of the mirror image are aligned with one another.

11. The computer software of claim 8 wherein code moving the mirror image and/or the image with respect to one another comprises code gradually moving the mirror image and/or the image with respect to one another to sequentially reveal a plurality of hidden images.

12. The computer software of claim 8 wherein code moving the mirror image and/or the image with respect to one another comprises code moving the mirror image and/or the image with respect to one another to sequentially reveal a story told through a plurality of sequentially revealed images.

13. The computer software of claim 8 wherein code obtaining an image comprises activating a camera.

14. The computer software of claim 8 wherein code obtaining an image comprises code obtaining a stored image from memory.

15. The computer software of claim 8 wherein code moving the mirror image and/or the image with respect to one another comprises code sliding the mirror image and/or the image in a straight line with respect to one another.

16. The computer software of claim 8 wherein code moving the mirror image and/or the image with respect to one another comprises code rotating the mirror image and/or the image with respect to one another.

\* \* \* \* \*